United States Patent
Chen et al.

(10) Patent No.: US 10,566,899 B2
(45) Date of Patent: Feb. 18, 2020

(54) COUPLED INDUCTOR IN A DC-DC CONVERTER

(71) Applicant: LEN Technology Limited, Jiangsu (CN)

(72) Inventors: Jingquan Chen, San Jose, CA (US); Chuan Ni, Plano, TX (US)

(73) Assignee: LEN Technology Limited, Jiangsu (CN)

( * ) Notice: Subject to any disclaimer, the term of this patent is extended or adjusted under 35 U.S.C. 154(b) by 18 days.

(21) Appl. No.: 15/971,282

(22) Filed: May 4, 2018

(65) Prior Publication Data

US 2018/0323709 A1    Nov. 8, 2018

(30) Foreign Application Priority Data

May 5, 2017    (CN) .......................... 2017 1 0310616

(51) Int. Cl.
| | |
|---|---|
| *H02M 3/155* | (2006.01) |
| *H02J 1/10* | (2006.01) |
| *H02M 3/158* | (2006.01) |
| *H01F 37/00* | (2006.01) |
| *H01F 3/12* | (2006.01) |

(Continued)

(52) U.S. Cl.
CPC ............. *H02M 3/155* (2013.01); *H01F 3/12* (2013.01); *H01F 27/006* (2013.01); *H01F 27/2823* (2013.01); *H01F 37/00* (2013.01); *H02J 1/102* (2013.01); *H02M 3/1584* (2013.01); *H02M 2001/0019* (2013.01); *H02M 2001/0064* (2013.01)

(58) Field of Classification Search
CPC ............. H02M 3/155; H02M 3/1584; H02M 2001/0019; H02M 2001/0064; H01F 3/12; H01F 17/04; H01F 27/24; H01F 27/28; H01F 27/06
See application file for complete search history.

(56) References Cited

U.S. PATENT DOCUMENTS 6,362,986 B1 * 3/2002 Schultz ................. H02M 3/158
363/132
8,421,578 B2    4/2013 Huang et al.
(Continued)

FOREIGN PATENT DOCUMENTS

CN        102314998 B       6/2013

OTHER PUBLICATIONS

Sturcken et al, "Integrated Voltage Regulator Using Coupled-Magnetic-Core Inductors on Silicon Interposer", Jan. 2013, IEEE Journal of Solid State Circuits, vol. 48, pp. 1-11.*

*Primary Examiner* — Emily P Pham
(74) *Attorney, Agent, or Firm* — Seed IP Law Group LLP

(57) ABSTRACT

This disclosure is related to the technical field of magnets, and in particular to a method for applying a coupled inductor to a DC-DC converter providing a DC current output, and based on the number of phases of the DC-DC converter, the coupled inductor is designed to have a corresponding number of windings, the windings are reversely coupled to cancel out the magnetizing fields to avoid flux saturation of the magnet material under high current excitation, and the coupled inductor has air gaps, the leakage flux in the air gap induced by each winding is in the same direction, the leakage magnetic flux is used to achieve the filtering of the output current.

14 Claims, 11 Drawing Sheets

(51) Int. Cl.
*H01F 27/28* (2006.01)
*H01F 27/00* (2006.01)
*H02M 1/00* (2006.01)

(56) References Cited

U.S. PATENT DOCUMENTS

| | | | |
|---|---|---|---|
| 9,601,262 B2 * | 3/2017 | Ye | H02M 7/487 |
| 2016/0172310 A1 * | 6/2016 | Zhai | H01L 23/552 |
| | | | 257/659 |
| 2017/0098998 A1 * | 4/2017 | Zhou | H02M 3/1584 |

* cited by examiner

US 10,566,899 B2

COUPLED INDUCTOR IN A DC-DC CONVERTER

RELATED APPLICATION

This application claims priority from and the benefits of Chinese application 201710310616.2 filed on May 5, 2017, titled A METHOD FOR APPLYING A COUPLED INDUCTOR TO A DC-DC CONVERTER PROVIDING DC CURRENT OUTPUT AND A COUPLED INDUCTOR STRUCTURE, the disclosure of which is incorporated herein by reference in its entirety.

TECHNICAL FIELD

This disclosure is related to the technical field of power devices, and in particular to a method for applying a coupled inductor to a DC-DC converter providing a DC current output and a coupled inductor structure.

RELATED ART

A DC-to-DC switching converter is a power electronic device that converts a direct current (DC) power source into a DC power output with a controllable DC voltage or controllable DC current based on the requirement by the load; it is based on the fast on-off control of power electronic devices. The DC input voltage is converted into a series of pulsed voltages, and the pulse width or frequency is controlled to regulate the average output voltage or the average output current, the pulsed voltage or current is then filtered through the output filters to achieve desired DC voltage or current.

In multi-phase applications, inductors as indispensable circuit components generally have two variations: discrete inductors and coupled inductors. The multiple phases of discrete inductors and power devices are to improve the output current capability of the DC-DC converter, but it usually leads to a larger size of the entire implementation. Through the reduction of the leakage inductance, the coupled inductor improves the load response speed of the DC-DC converter, thereby reducing the output capacitance. A coupled inductor also has potential to reduce the size and cost of the entire device.

In the related art, a coupled inductor is only used in a DC-DC converter to provide a DC voltage output. In the related art, the coupled inductor design is to minimize the leakage inductance to achieve the fast-transient recovery capability. However, the small leakage inductance increases the output current ripple, which limits the coupled inductor in the applications that require a regulated DC current.

DETAILED DESCRIPTION

Figure 1:
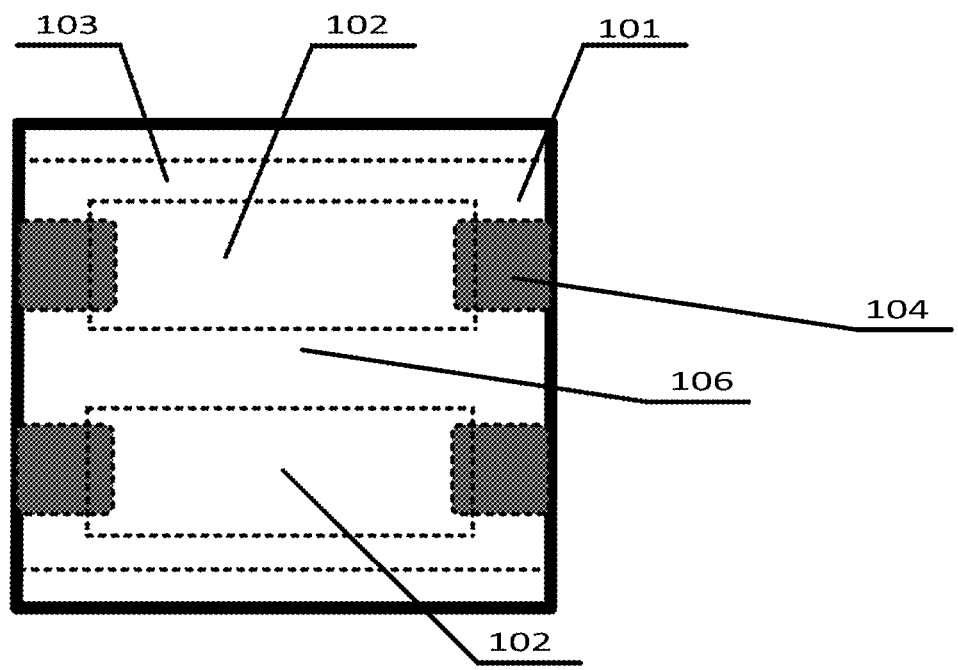
FIG. 1 is a top view diagram of a first example device.

In order to solve the above-mentioned technical issues, this disclosure provides a method for applying a coupled inductor to a DC-DC converter providing a DC current output and a coupled inductor structure based on the method.

This disclosure provides a technique for applying a coupled inductor to a DC-DC converter providing a DC current output characterized in that, based on the number of phases of the DC-DC converter, the coupled inductor is designed to have a corresponding number of windings, the windings are reversely coupled to cancel out the magnetizing field to avoid flux saturation of the magnet material under high current excitation, and the coupled inductor also has air gaps, the leakage magnetic flux induced by each winding in the air gap are in the same direction, and the leakage magnetic flux is used to achieve the filtering function of the output current, the turns of winding coil can be increased to increase the leakage inductance and filtering effect.

Designing a coupled inductor based on the above technique, two technical solutions are obtained:

In a first example technical solution, a coupled inductor includes an upper magnet, a lower magnet, a plurality of magnetic columns, and the number of the magnetic columns is at least two. The magnetic columns are situated on the lower magnet, and the left and right ends of the lower magnet protrude over the left side of the leftmost column and the right side of the rightmost column, respectively. The upper magnet is situated on the top surface of the magnetic columns. The left and right ends of the lower magnet protrude over the left side of the leftmost column and the right side of the rightmost column, respectively, and the bottom surface of the left and right ends of the upper magnet is in parallel with the top surface of the left and right ends of the lower magnet respectively and have a spacing distance in the vertical direction, which forms air gaps I. The spacing distance between the adjacent magnetic columns forms air gaps II. Each magnetic column is surrounded by windings. When reversely coupled, the direction of the magnetizing flux induced in the magnetic columns by one winding is opposite to the direction of the magnetizing magnetic flux induced by windings on the opposite magnetic column. On the opposite, the direction of the leakage magnetic flux induced by each winding is the same in the air gaps I and air gaps II.

In a second example technical solution, a coupled inductor includes an upper magnet, a lower magnet, a plurality of magnetic columns, and the number of the magnetic columns is at least two. The left and right ends of the lower magnet protrude upward and form a valley therebetween in the middle section, the magnetic columns are situated in the valley of the lower magnet, the upper magnet is situated on the top surface of the magnetic columns, the top surface of the upper magnet is at substantially the same level as the top surfaces of the two protruding ends of the lower magnet, the left and right sides of the upper magnet and the inner side of the valley has a spacing distance, the spacing distance forms air gaps I, and the spacing between the adjacent magnetic columns form air gaps II. Each magnetic column is surrounded by windings; when reversely coupled, the direction of the magnetizing flux induced in the magnetic columns by one winding is opposite to the direction of the excitation magnetic flux induced by windings on another magnetic column. On the opposite, the direction of the leakage magnetic flux induced by each winding are the same in air gap I and air gap II.

The two example technical solutions and other example embodiments of the techniques have the following advantages: they both utilize the reversely coupled magnetizing flux to avoid magnetic material saturation, at the same time they both utilize the leakage flux in air gap I and air gap II to filter the output current.

Further, the upper magnet and the lower magnet are each composed of a plurality of magnet blocks connected in series, and the number of the magnet blocks is the same as the number of the magnetic columns, and each magnet block corresponds to a magnetic column; the upper magnet and lower magnet are physically separate to facilitate the manufacturing of the windings.

Further, the cross-section of the magnet column can be rectangular, square, round or irregular shape for different applications.

Further, the upper magnet, magnet columns, and the lower magnet can be physically a whole piece.

Further, the shape of the magnet columns can be the same or different for different applications.

Further, the distance among the magnet columns can be the same or different for different applications.

Further, the turns of the windings can be a single turn or multiple turns for different applications.

Further, the turns of the windings on each magnet column can be the same or different.

In the field of electronics technology, coupled inductors originally find applications in the multi-phase converters in order to improve the load transient response speed compared to a converter with discrete inductors. As a result, the inductance is usually optimized as small as possible; however, this concept fits poorly in the applications of DC-DC converter with DC current output.

In this disclosure, the leakage inductance of a coupled inductor is optimized to a larger value such that it provides better filtering for the output current. Here is the design method: based on the number of phases of the DC-DC converter, the coupled inductor is designed to have a corresponding number of windings, the windings are reversely coupled to cancel out the magnetic fields to avoid flux saturation of the magnet material under high current excitation, and the coupled inductor also has air gaps, the leakage magnetic flux induced by each winding in the air gap are in the same direction, and the leakage magnetic flux is used to achieve the filtering function of the output current. The turns of winding coil can be increased to increase the leakage inductance.

Figure 2:
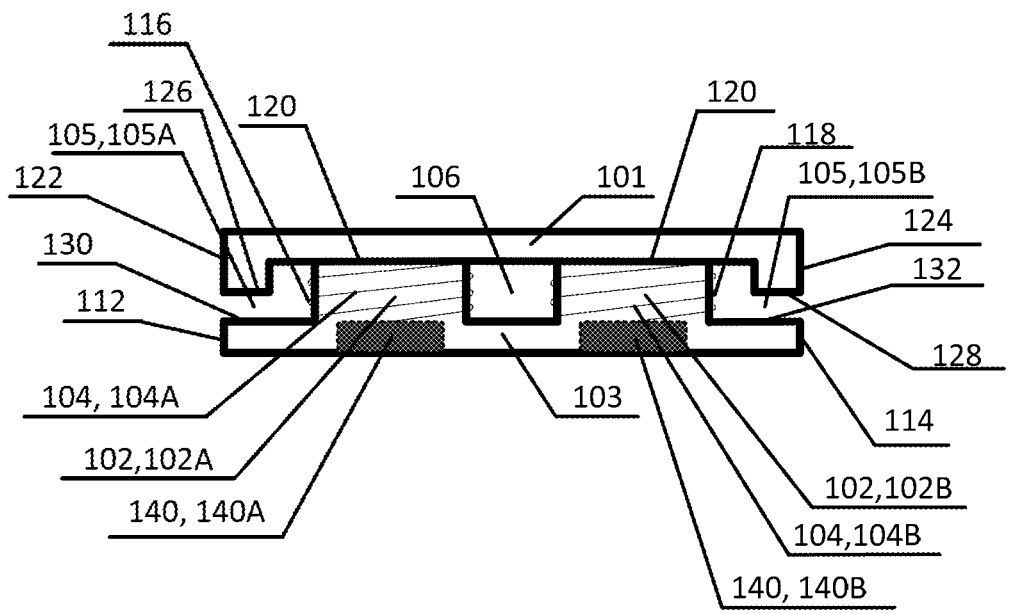
FIG. 2 is a cross-sectional view of the first example device.

Several implementation examples are described in the following:

FIG. 1 and FIG. 2 show a first implementation example 1, which doesn't limit the scope of the disclosure.

As shown in FIG. 1 and FIG. 2, a coupled inductor 100 includes an upper magnet 101, a lower magnet 103, and magnetic columns 102. The number of the magnetic columns 102 is at least two. In an embodiment, the magnetic columns 102 are positioned on or integrated with the lower magnet 103, and the left and right ends 112, 114 of the lower magnet 103 extend beyond the left side 116 of the leftmost column 102A and the right side 118 of the rightmost column 102B, respectively. The upper magnet 101 is positioned on the top surfaces of the magnetic columns 102 (102A, 102B). The left and right ends 122, 124 of the upper magnet 101 extend beyond the left side 116 of the leftmost column 102A and the right side 118 of the rightmost column 102B, respectively. The bottom surfaces 126, 128 of the left and right ends 122, 124 of the upper magnet 101 are further protruded downward toward the lower magnet 103, and the bottom surface 126, 128 is substantially in parallel with the top surface 130, 132 of the left and right ends 112, 114 of the lower magnet 103, respectively, and have a spacing distance in the vertical direction. This vertical spacing distance forms air gaps I 105. The spacing distance between the adjacent magnetic columns 102A, 102B forms air gap(s) II 106. Each magnetic column 102 (102A, 102B) is surrounded by windings 104. When the windings 104 (104A, 104B) are reversely coupled, the direction of the magnetizing flux induced in the magnetic columns by one winding 104 (e.g., 104A) is opposite to the direction of the magnetizing magnetic flux induced by another winding 104 (104B) on another magnetic column(s) 102 (102B). On the opposite, the direction of the leakage magnetic flux induced by each windings 104 (104A, 104B) are the same in the air gaps I 105 and air gaps II 106.

The windings 104 (104A, 104B) are coupled to the lower magnet 103 through connect features 140 (140A, 140B), e.g., of solder welding.

Figure 3:
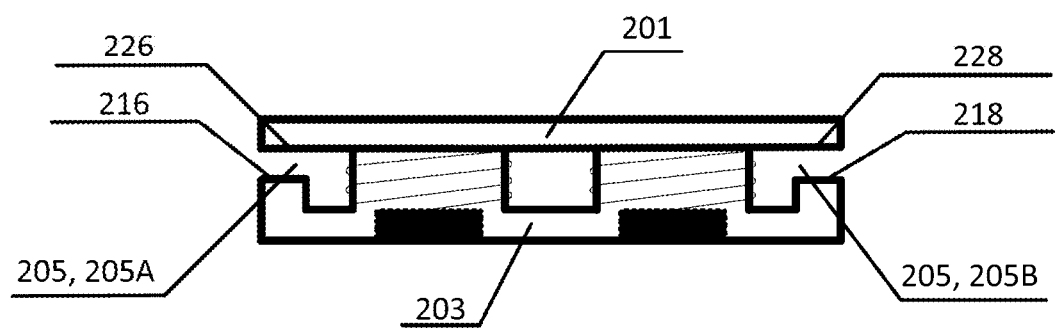
FIG. 3 is a cross-sectional view diagram of an implementation of a second example device.

FIG. 3 shows another implementation example 2 of the disclosure, which doesn't limit the scope of the disclosure.

As shown in FIG. 3, the implementation example 2 is achieved by swapping the structure of the upper magnet 101 and the lower magnet 103 in FIG. 2. The surfaces 216, 218 of the end portions of the lower magnet 203 protrude upward toward the upper magnet 201, which is substantially flat. Surfaces 216, 218 of the protruding end portions of the lower magnet 203 are substantially parallel to the opposite surfaces 226, 228 of the upper magnet 201. Air gaps 205 (205A, 205B) have a profile similar to the air gaps 105 (105A, 105B) of FIG. 4 in a reversed manner.

Figure 4:
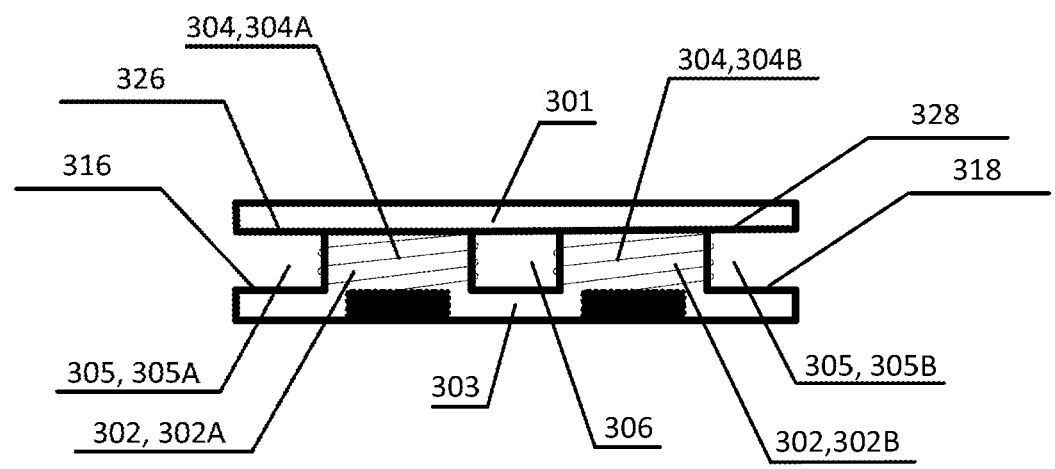
FIG. 4 is a cross-sectional view diagram of an implementation of a third example device.

FIG. 4 shows another implementation example 3, which doesn't limit the scope of the claims.

As shown in FIG. 4, a coupled inductor 300 includes an upper magnet 301, a lower magnet 303, magnetic columns 302. The number of the magnetic columns 302 is at least two. The magnetic columns 302 are positioned on or integrated with the lower magnet 303, and the left and right ends of lower magnet 3 extend over the left side of the leftmost column 302A and the right side of the rightmost column 302B, respectively; the upper magnet 301 is situated on the top surface of the magnetic columns 302. The left and right ends of the upper magnet 301 extend beyond the left side of the leftmost column 302A and the right side of the rightmost column 302B, respectively. The bottom surfaces 326, 328 of the upper magnet 301 are substantially in parallel with the top surfaces 316, 318 of the lower magnet 303 respectively. There is a spacing distance between the bottom surfaces 326, 328 of the upper magnet 301 and the top surfaces 316, 318 of the lower magnet 303. These spacing distances form air gaps I 305 (305A, 305B). The spacing distance between the adjacent magnetic columns 302 forms air gaps II 306. Each magnetic column 303 is surrounded by windings 304 (304A, 304B). When the windings 304A, 304B are reversely coupled, the directions of the magnetizing flux induced in the magnetic columns 302 by one winding 304 is opposite to the direction of the magnetizing magnetic flux induced by windings 304 on other magnetic columns 304. On the opposite, the direction of the leakage magnetic flux induced by each windings 304 are the same in air gaps I 305 and air gaps II 306.

Figure 5:
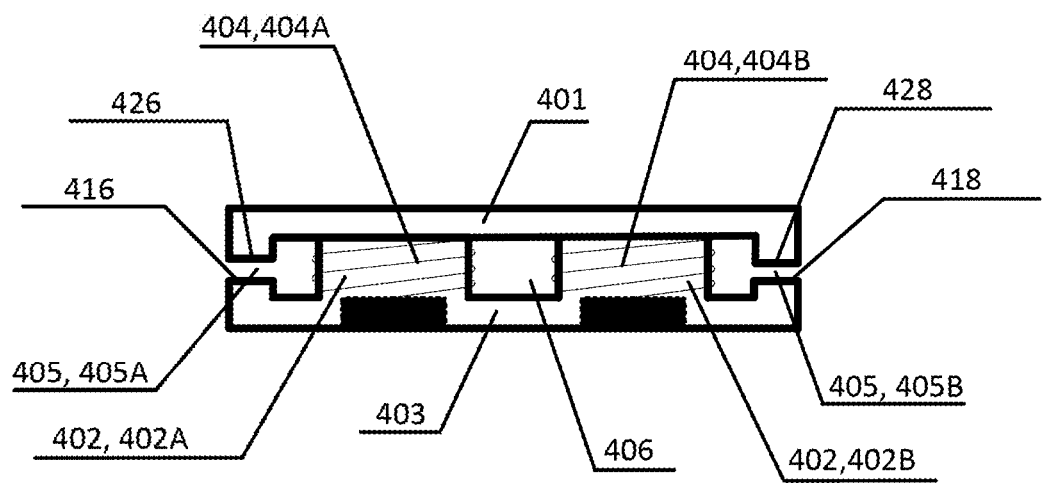
FIG. 5 is a cross-sectional view diagram of an implementation fourth example device.

FIG. 5 shows another implementation example 4, which doesn't limit the scope of the disclosure.

As shown in FIG. 5, a coupled inductor 400 includes an upper magnet 401, a lower magnet 403, and magnetic columns 402. The number of the magnetic columns 402 is at least two. The magnetic columns 402 are positioned on or integrated with the lower magnet 403, and the left and right ends of lower magnet 403 protrude over the left side of the leftmost column 402A and the right side of the rightmost column 402B, respectively, and the top surfaces 416, 418 of the left and right ends of the lower magnet 403 protrude upward toward the upper magnet 401. The upper magnet 401 is positioned on the top surface of the magnetic columns 402, and the left and right ends of the upper magnet 401 protrude over the left side of the leftmost column 402A and the right side of the rightmost column 402B, respectively. The bottom side 426, 428 of the left and right ends of the upper magnet 401 further protrudes downward toward the lower magnet 403. The bottom surfaces 426, 428 are substantially each in parallel with the top surfaces 416, 418 of the left and right ends of the lower magnet 403 respectively, and have a spacing distance in the vertical direction. This spacing distance form air gaps I 405 (405A, 405B). The spacing distance between the adjacent magnetic columns 402 forms air gaps II 406. Each magnetic column 402 is surrounded by windings 404 (404A, 404B). When windings 404A, 404B are reversely coupled, the direction of the magnetizing flux induced in the magnetic columns 402A by one winding 404A is opposite to the direction of the magnetizing magnetic flux induced by windings 404B on other magnetic columns 402B. On the opposite, the direction of the leakage magnetic flux induced by each windings 404A, 404B are the same in air gaps I 405 and air gaps II 406.

Figure 6:
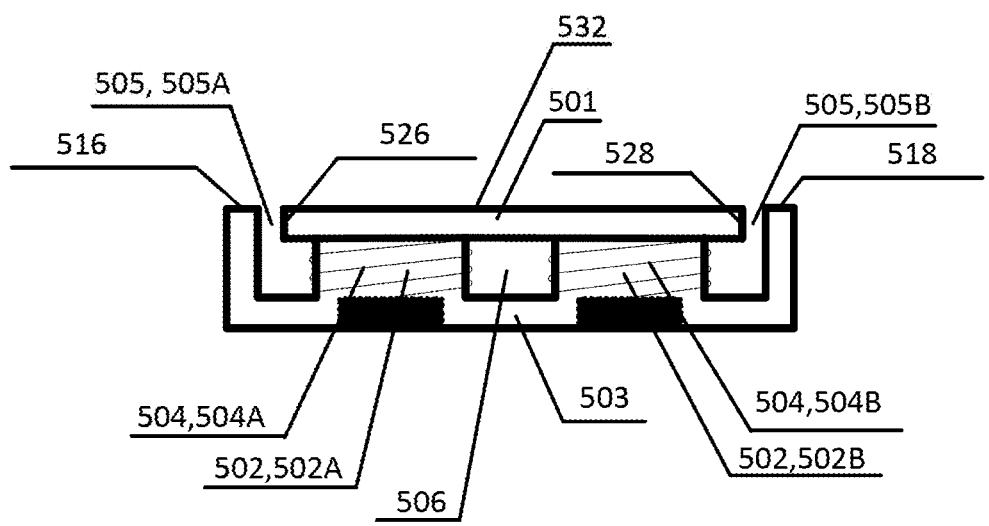
FIG. 6 is a cross-sectional view diagram of implementation of a fifth example device.

FIG. 6 shows another implementation example 5, which doesn't limit the scope of the claims to example 5.

As shown in FIG. 6, a coupled inductor includes upper magnet 501, lower magnet 503, magnetic columns 502. The number of the magnetic columns 502 is at least two. The left and right ends of lower magnet 503 protrude upward and form a valley 530 in the middle section. The magnetic columns 502 are situated in the valley 530 formed by the lower magnet 503. The upper magnet 501 is positioned on the top surface of the magnetic columns 502. The top surface 532 of the upper magnet 501 is substantially at the same level as the top surfaces 516, 518 of the two protruding ends of the lower magnet 503. The left and right sides 526, 528 of the upper magnet 501 and the respective inner side of the two protruding ends of the lower magnet 503 have spacing distances, which form air gaps I 505 (505A, 505B). The spacing between the adjacent magnetic columns 502 forms air gap II 506. Each magnetic column 502 is surrounded by windings 504. When the windings 504 are reversely coupled, the direction of the magnetizing flux induced in the magnetic columns 502 by one winding 504 is opposite to the direction of the excitation magnetic flux induced by windings 504 on other magnetic columns 502. On the opposite, the direction of the leakage magnetic flux induced by each winding 504 is the same in air gap I 505 (505A, 505B) and air gap II 506.

Based on FIG. 7, another implementation example 6 is described in the following, but implementation example 6 doesn't limit the scope of the claims.

Figure 7:
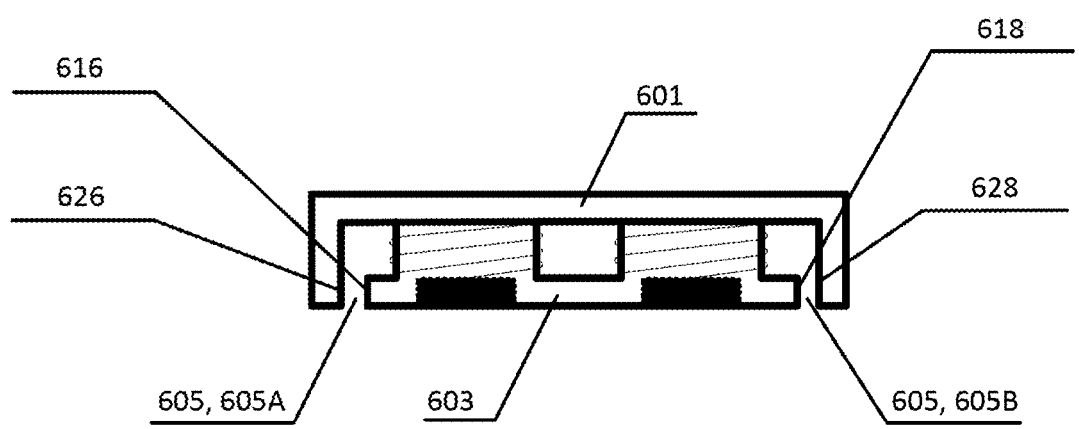
FIG. 7 is a cross-sectional view diagram of an implementation of a sixth example device.

As shown in FIG. 7, the implementation example 6 is achieved by swapping the structure of the upper magnet and the lower magnet of the implementation example 5 from FIG. 6.

In the above-mentioned implementation, it is worthwhile to highlight the following points:

1. Air gap I is not limited to the positions of the left and right ends of the upper and lower magnets; they may be located between the front and rear sides of the upper magnet and the front and rear sides of the lower magnet, or in other positions, as long as magnetic leakage path can be formed.

2. Both the upper magnet and the lower magnet may be composed of a plurality of sequentially connected magnet blocks. The number of magnet blocks is the same as the number of magnetic cylinders. Each magnet block contains a magnetic column. The magnet blocks are physically separated to easily facilitate the wire winding process in the overall manufacturing of the device.

3. The winding can be single turn or multiple turns.

Figure 8:
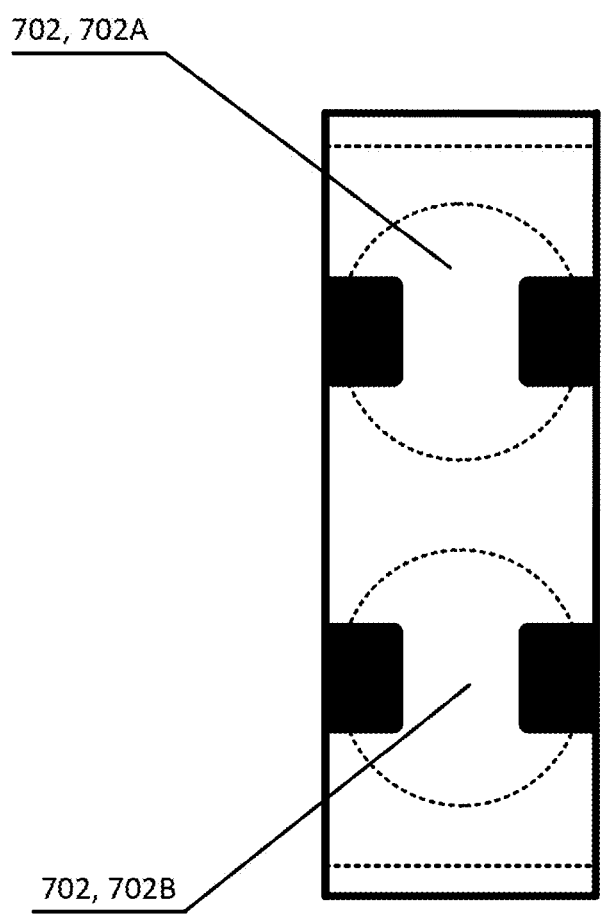
FIG. 8 is a top view diagram with round magnet columns.

4. The cross-section the magnetic column can be circular, square or other irregular shapes. As shown in FIG. 8, the cross-section of the magnetic column is a circular structure. When using a circular cross-section, the circumference is smaller than that of an equal area rectangle, and thus the winding length is less for a circular design.

Figure 9:
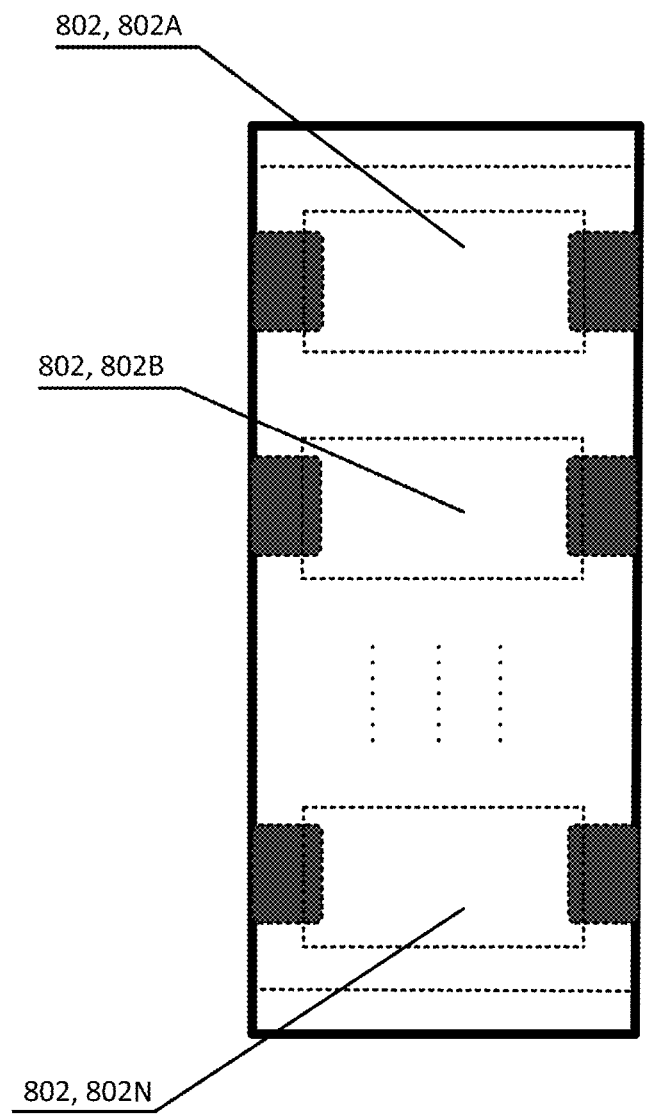
FIG. 9 is a plan view diagram for a multi-phase coupled inductor design.

5. The number of magnetic columns is not limited to two, and can be set to a plurality according to the number of phases, i.e., the structure shown in FIG. 9 has a plurality of magnetic columns.

6. Each magnetic column structure can be the same or different.

7. The spacing among all columns can be equal or different.

8. The turns of winding on each magnetic column can be equal or different.

Figure 10:
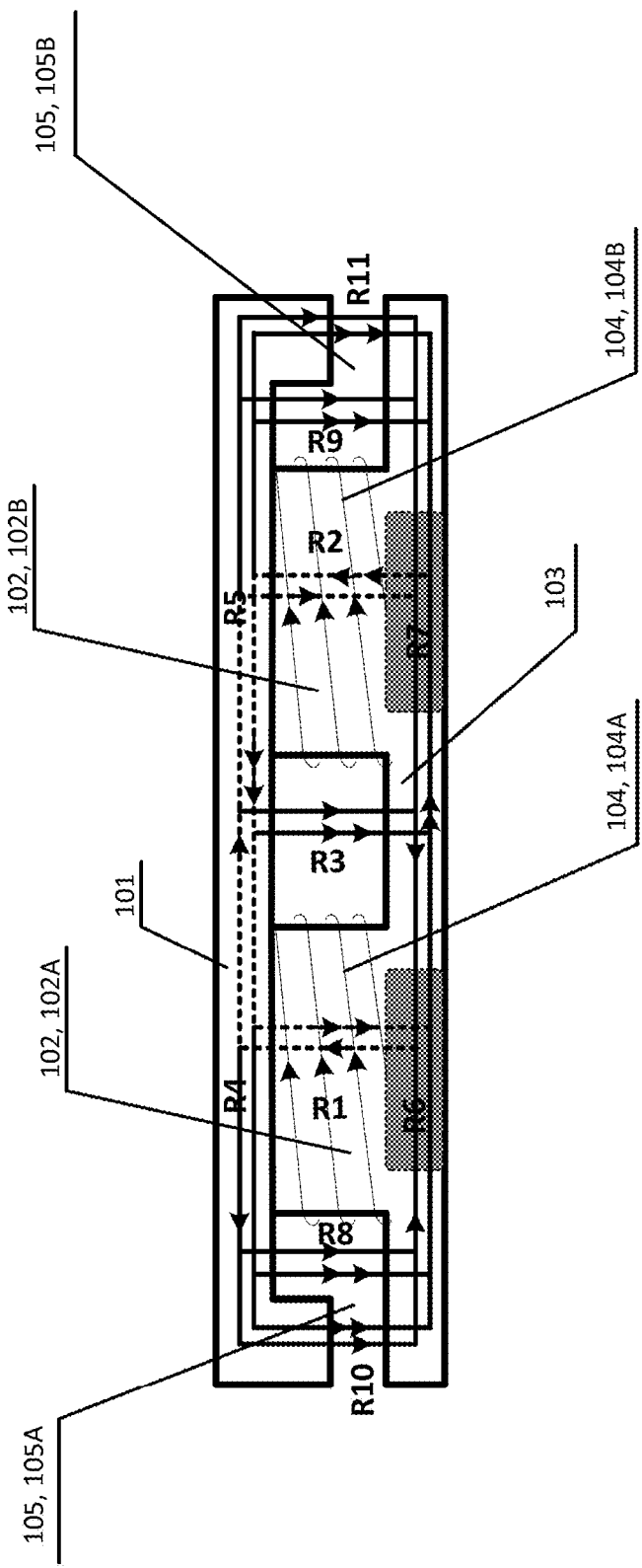
FIG. 10 illustrates flux paths and their equivalent reluctance using the first example device.

The following analysis is based on implementation example 1 and the equivalent reluctance of each flux path shown in FIG. 10.

As shown in FIG. 10, the winding in each magnetic column produces magnetizing flux which is opposite from those produced by windings from other magnetic columns, thus it achieves the effect of reversely coupling, and can effectively avoid the saturation of magnet materials. The same winding produces leakage flux in air gap I and II, which is in the same direction from those produced by windings from other magnetic columns, and it achieves the effect of filtering the output current.

The reluctance R can be written as:

$$R = l/(u*A),$$

where l is the length of the flux path, u is the permeability of the magnetic core material or air, A is the cross-sectional area of the flux path.

Based on the implementation example 1, an integrated coupled inductor is designed with the following parameters, and the circuit operation is simulated to validate the benefits claimed in this disclosure.

Figure 11:
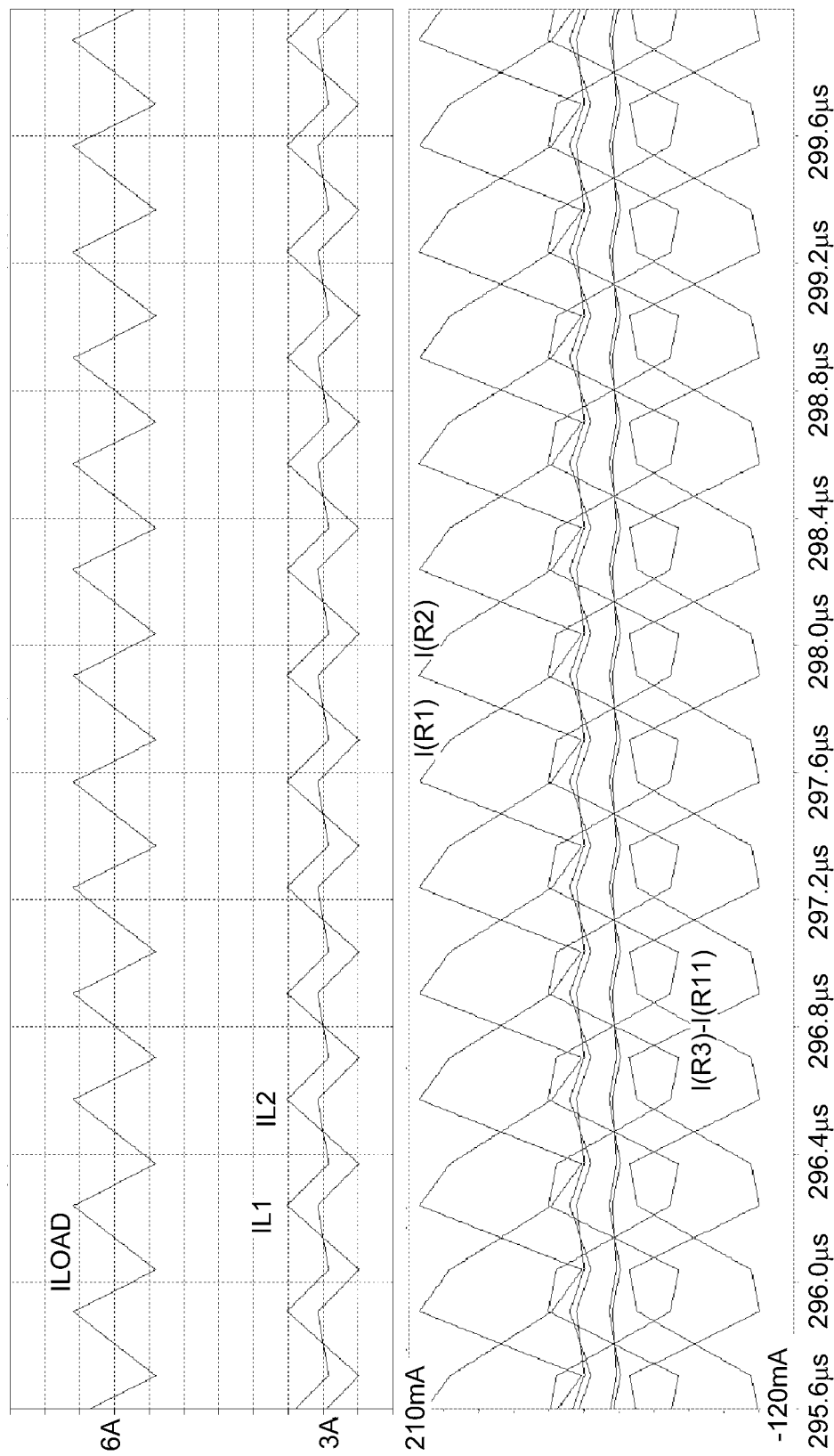
FIG. 11 is the waveforms for output current ripple and flux density of the first example device.

The coupled inductance Lm=1 uH, and the leakage inductance Le=1 uH. The input voltage is 12V, the output voltage is 3.6V, the load current is 6 A, the switching frequency is 1.5 MHz, and the total output current peak to peak ripple is around 1 A. This is equivalent to the total ripple in the same application with two 1 uH discrete inductors. FIG. 11 shows the waveforms of the simulation results, and the maximum flux density is about 0.21 T.

Figure 12:
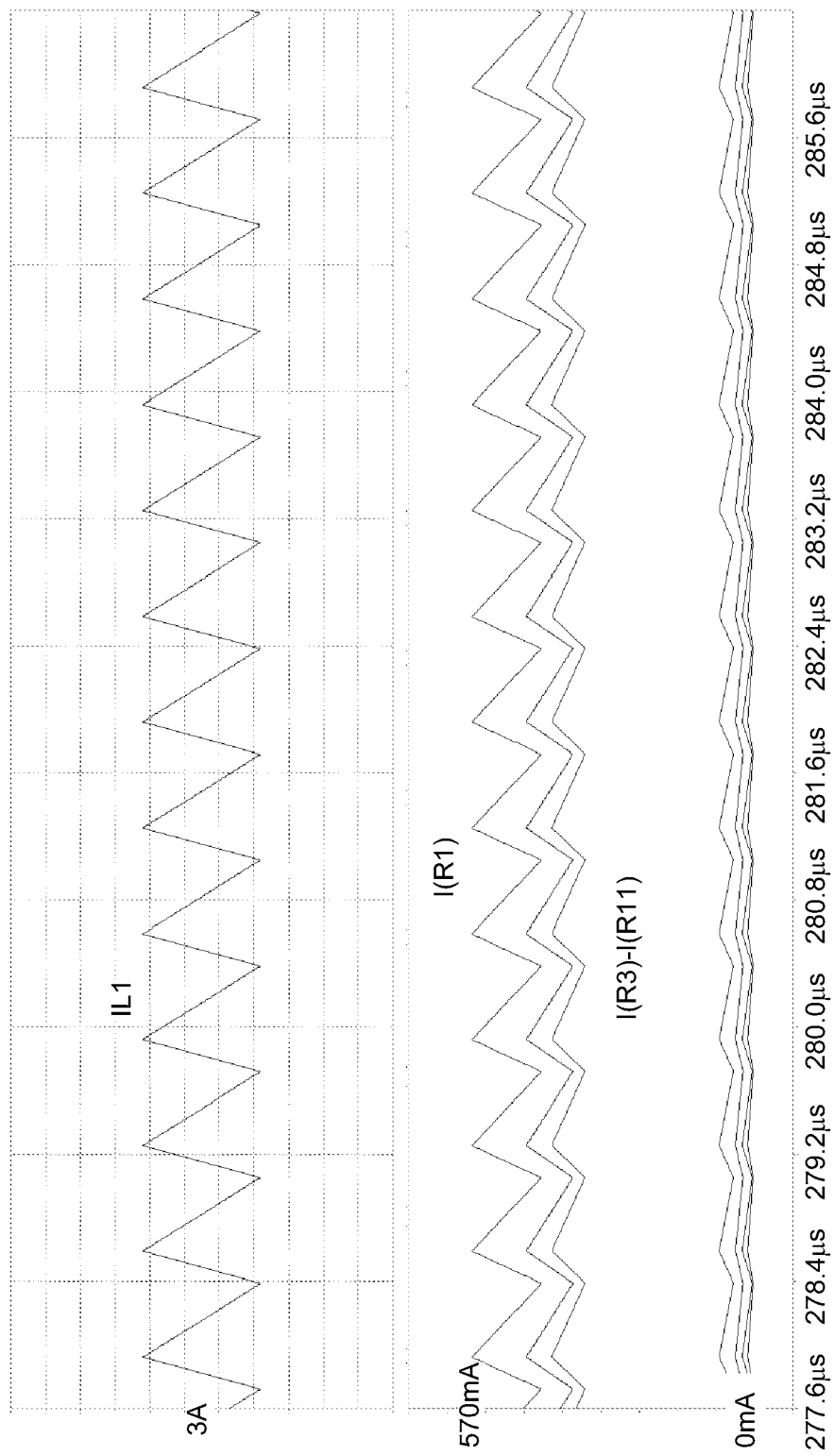
FIG. 12 is the waveforms for output current ripple and flux density of the implementation of the first example device when only one phase conducts current.

As a comparison, when only one phase is excited with 3 A of magnetizing current, the simulation results shown in FIG. 12 reveal that the maximum flux density is 0.54 T.

Figure 14:
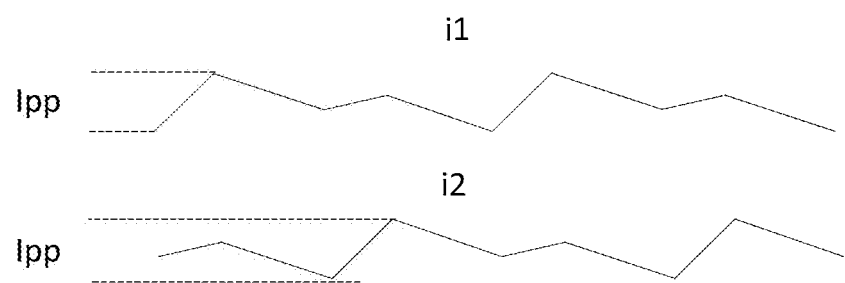
FIG. 14 is the current waveforms in a two-phase coupled inductor.

From the results shown in FIGS. 11 and 14, we can conclude that this disclosure when applied in the DC-DC converter with current output, can effectively avoid the saturation of the magnetic material under large excitation current and at the same time it can achieve good output current filtering.

Figure 13:
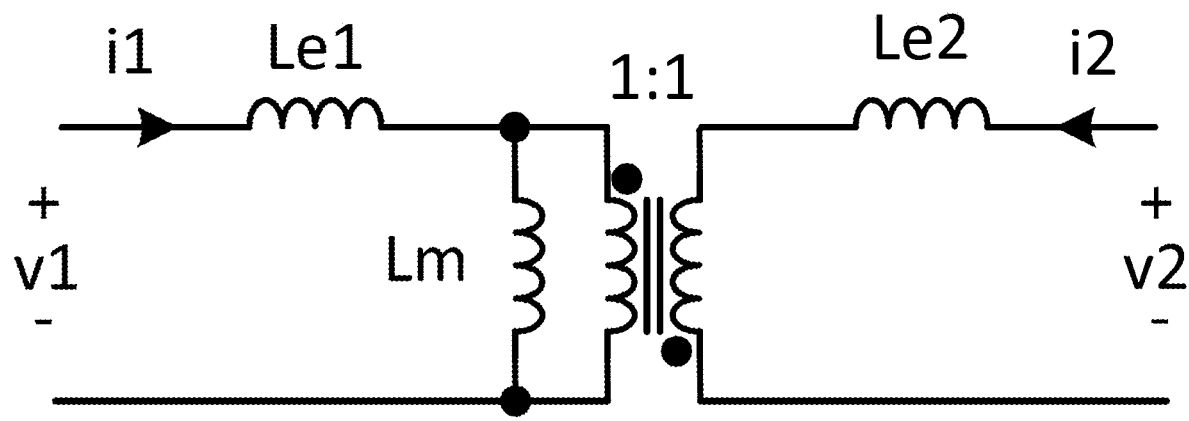
FIG. 13 is an example circuit including a two-phase coupled inductor.

The coupled inductor magnetizing inductance and leakage inductance can be modeled in FIG. 13.

In the model, Lm is the coupled inductance, and Le1 and Le2 are the leakage inductance respectively. When the two phases are symmetric, Le1 is the same as Le2 and represented as Le in the analysis. The current waveforms of the coupled inductors in a step-down DC-DC converter are shown in FIG. 14. When Lm/Le>>1, and when the input and output voltage ratio is more than 2, the peak to peak ripple current can be written as:

$$Ipp=Vout*(Vin-2*Vout)/(Vin*fs*Le),$$

Vin is the input voltage, Vout is the output voltage, and fs is the switching frequency. It can be observed that the ripple current amplitude is inversely proportional to the leakage inductance. Under the condition of same Vin, Vout and fs, increasing leakage inductance can effectively reduce the ripple current. The coupled inductor structure in this disclosure can effectively increase the winding turns to increase the leakage inductance.

Figure 15:
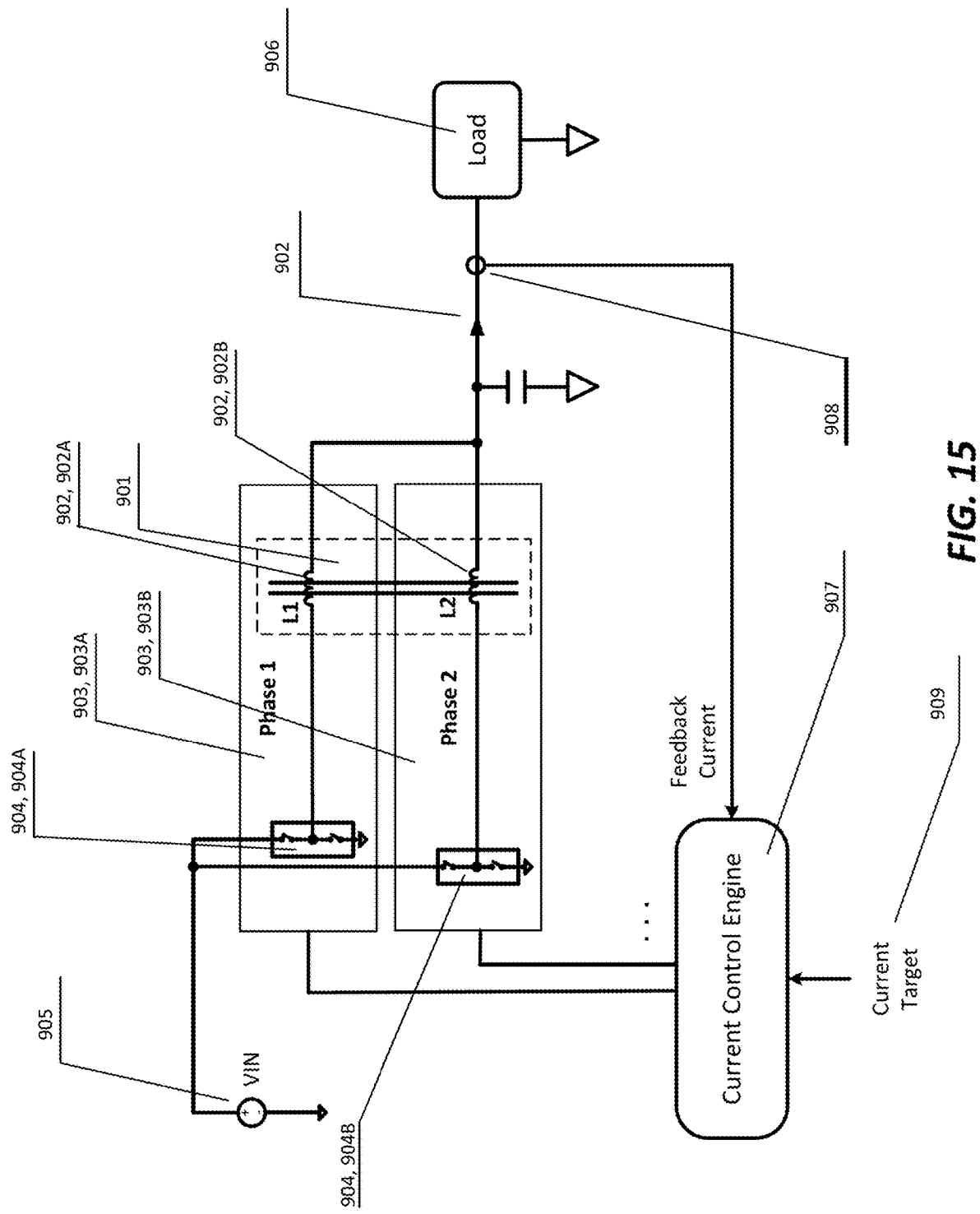
FIG. 15 is a circuit diagram of a DC-DC converter including the example coupled inductors.

In FIG. 15, A Multi-phase DC-DC converter with the regulated DC output current of the disclosure 900 includes multiple phases of DC-DC buck converter 903 (903A, 903B), each phase (903A or 903B) contains a pair of power devices 904 (904A, 904B), and one of the windings 902 (902A or 902B) of a two-phase coupled inductor (901). The two-phase DC-DC converter 903 has an input supply 905 and it powers a DC load 906 which requires a regulated DC current, an example of such application is the multi-phase DC-DC converter for the fast charger applications. A desired DC output current 902 is achieved through a Current Control Engine 907, which takes a commanded Current target 909 and a sensed Feedback current 908, the Current Control Engine 907 controls the on and off control of the power devices 904 (904A, 904B) and the duration control of the on/off states of the power devices 904, with a target to regulated the output current 902 towards the Current target 909.

The coupled inductor is applied to the DC-DC converter providing a DC current output. Based on a number of phases of the DC-DC converter, the coupled inductor having a corresponding (i.e., same) number of windings. The windings are mutually reversely coupled to cancel out magnetizing fields and to avoid flux saturation of magnet material under high current excitation. The coupled inductor has an air gap(s). The leakage magnetic flux in the air gap induced by each winding are in a same direction, and the leakage magnetic flux function to achieve a filtering function of the DC current output. The use of mutually reversely coupled inductor design avoids flux saturation of the magnet material under the high current excitation. At the same time, the leakage magnetic flux in the air gaps plays a role in the filtering of the DC current output. The windings of the winding coil can be increased to increase leakage inductance.

In summary, the disclosed coupled inductor disclosure has the following advantages: it utilizes the reversely coupled inductor design to avoid saturation of magnetic materials under large current excitation and, at the same while, it uses the leakage flux in the air gaps to filter the output current.

It needs to be mentioned that the implementation examples in this disclosure are only used to describe and explain the disclosure; the disclosure is not limited to the implementation examples described in this disclosure. The technologists in the same field would understand that slight or equivalent changes on the implementation details can still achieve similar results, and such implementation falls into the protection range of this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The disclosure may be further understood based on the following clauses:

Clause 1: A method for applying a coupled inductor to a DC-DC converter providing a DC current output, and based on a number of phases of the DC-DC converter, the coupled inductor having a corresponding number of windings, the windings being mutually reversely coupled to cancel out magnetizing fields and to avoid flux saturation of magnet material under high current excitation, and the coupled inductor having an air gap, leakage magnetic flux in the air gap induced by each winding are in a same direction, and the leakage magnetic flux being configured to achieve a filtering function of the DC current output.

Clause 2: A coupled inductor based on the method of clause 1, the coupled inductor includes an upper magnet, a lower magnet, magnetic columns, and the number of the magnetic columns is at least two, the magnetic columns being positioned on the lower magnet, and left and right ends of the lower magnet protruding over a left side of a leftmost magnetic column and a right side of a rightmost magnetic column, respectively, the upper magnet being positioned on a top surface of the magnetic columns, and the left and right ends of the upper magnet protruding over the left side of the leftmost magnetic column and the right side of the rightmost magnetic column, respectively, and a bottom surface of the left and right end of the upper magnet being in parallel with a top surface of the left and right ends of the lower magnet, respectively, and having a spacing distance in a vertical direction, this spacing distance forms air gaps I, and the spacing distance between the adjacent magnetic columns forms air gaps II, each magnetic column is surrounded by (the?) windings, when reversely coupled, a direction of magnetizing flux induced in the magnetic columns by one winding is opposite to the direction of magnetizing flux induced by windings on other magnetic columns, on the opposite, the direction of the leakage magnetic flux induced by each windings are the same in air gaps I and air gaps II.

Clause 3: A coupled inductor based on the method for applying a coupled inductor to a DC-DC converter providing a DC current output according to clause 1, is characterized in that it includes an upper magnet, a lower magnet, magnetic columns, and the number of the magnetic columns is at least two, left and right ends of the lower magnet protrude upward and form a valley in a middle section, the magnetic columns are situated in the valley of the lower magnet, the upper magnet is situated on a top surface of the magnetic columns, the top surface of the upper magnet is at the same level as the top surfaces of the two protruded ends of the lower magnet, the left and right sides of the upper magnet and the inner side of the valley has a spacing distance, the spacing distance forms air gaps I, and the spacing between the adjacent magnetic columns form air gap II. Each magnetic column is surrounded by windings, when reversely coupled, the direction of the magnetizing flux induced in the magnetic columns by one winding is opposite to the direction of the excitation magnetic flux induced by windings on other magnetic columns. On the opposite, the direction of the leakage magnetic flux induced by each winding are the same in air gap I and air gap II.

Clause 4: A coupled inductor based on clause 2 or 3, wherein the upper magnet and the lower magnet are each composed of a plurality of magnet blocks connected in series, the number of the magnet blocks is the same as the number of the magnetic columns, and each magnet block has one magnetic column.

Clause 5: A coupled inductor based on clause 2 or 3, is characterized in that the magnetic column has a rectangular, square, circular or irregular cross section.

Clause 6: A coupled inductor based on clause 2 or 3, is characterized in that the upper magnet, the magnetic columns, and the lower magnet are a single piece.

Clause 7: A coupled inductor based on clause 2 or 3, is characterized in that all magnetic columns have the same structure.

Clause 8: A coupled inductor based on clause 2 or 3, is characterized in that the intervals among magnetic columns are equal or not equal.

Clause 9: A coupled inductor based on clause 2 or 3, is characterized in that the winding has a single turn or multiple turns.

Clause 10: A coupled inductor according to clause 9, is characterized in that the winding turns on each magnetic column are the same or different.

What is claimed is:

1. A device, comprising:
   a first magnet,
   a second magnet opposite to the first magnet in a first direction;
   a plurality of discrete magnetic columns positioned between the first magnet and the second magnet and within peripheral ends of each of the first or the second magnet in a second direction that is substantially perpendicular to the first direction;
   a plurality of windings each wound around a respective one of the plurality of discrete magnetic columns; and
   an air gap among the first magnet, the second magnet and the discrete magnetic columns, the air gap including a first air gap segment adjacent to a peripheral end of at least one of the first magnet and the second magnet and a second air gap segment adjacent to two of the plurality of the discrete magnetic columns;
   wherein a peripheral end of at least one of the first magnet or the second magnet protrudes toward another one of the first magnet or the second magnet.

2. The device of claim 1, wherein the peripheral ends of the first magnet protrude toward the second magnet and wherein a surface of the peripheral ends of the first magnet is substantially coplanar with a surface of the second magnet.

3. The device of claim 2, wherein the surface of the peripheral ends of the first magnet is substantially coplanar with an opposite surface of the second magnet.

4. The device of claim 1, wherein the first air gap segment includes a portion between the first magnet and the second magnet in the second direction.

5. A method, comprising:
   providing a coupled inductor, the coupled inductor including a first magnet, a second magnet opposite to the first magnet and at least two windings reversely coupled between the first magnet and the second magnet through discrete magnetic columns, a peripheral end of the first magnet protruding toward the second magnet such that a distance between the peripheral end of the first magnet and the second magnet is smaller than a height of each of the discrete magnetic columns;
   coupling the coupled inductor to outputs of multiple power devices of a multi-phase DC-DC converter; and
   operating the multi-phase DC-DC converter for a DC current output.

6. The method of claim 5, wherein the operating the multi-phase DC-DC converter includes controlling on and off states of each of the multiple power devices.

7. The method of claim 6, wherein the controlling the on and off states of each of the multiple power devices includes controlling a duration of each of the on or off states.

8. The method of claim 5, wherein the operating the multi-phase DC-DC converter includes providing a DC output current as a feedback to a load of the multi-phase DC-DC converter.

9. The method of claim 5, wherein a number of the at least two windings is equal to a number of the multiple power devices.

10. A device, comprising:
    a first magnet,
    a second magnet opposite to the first magnet in a first direction;
    a plurality of discrete magnetic columns positioned between the first magnet and the second magnet and within peripheral ends of each of the first magnet or the second magnet in a second direction that is substantially perpendicular to the first direction;
    a plurality of windings each adjacent to a respective one of the plurality of discrete magnetic columns; and
    an air gap among the first magnet, the second magnet and the discrete magnetic columns, the air gap including a first air gap segment adjacent to a peripheral end of at least one of the first magnet and the second magnet and a second air gap segment adjacent to two of the plurality of the discrete magnetic columns;
    wherein a distance between a peripheral end of the first magnet and an adjacent peripheral end of the second magnet is smaller than a height of a discrete magnetic column of the plurality of discrete magnetic columns in the first direction.

11. The device of claim 10, wherein the peripheral end of at least one of the first magnet or the second magnet protrudes toward another one of the first magnet or the second magnet.

12. The device of claim 10, wherein the peripheral end of the first magnet protrudes toward the second magnet and wherein a surface of the peripheral end of the first magnet is substantially coplanar with a surface of the second magnet.

13. The device of claim 12, wherein the surface of the peripheral end of the first magnet is substantially coplanar with an opposite surface of the second magnet.

14. The device of claim 10, wherein the first air gap segment includes a portion between the first magnet and the second magnet in the second direction.

* * * * *